United States Patent [19]

Douglas

[11] Patent Number: 5,164,129
[45] Date of Patent: Nov. 17, 1992

[54] METHOD OF FABRICATING A SELF-DEPLOYING STRUCTURAL ELEMENT

[75] Inventor: Craig Douglas, Lexington, Mass.
[73] Assignee: University of Lowell, Lowell, Mass.
[21] Appl. No.: 553,985
[22] Filed: Jul. 16, 1990

Related U.S. Application Data

[62] Division of Ser. No. 344,259, Apr. 27, 1989, Pat. No. 4,978,564.

[51] Int. Cl.$^5$ .............................................. B29C 67/22
[52] U.S. Cl. .................................. 264/25; 264/45.2; 264/46.6; 264/46.9; 264/342 R
[58] Field of Search .................. 264/46.6, 46.7, 46.9, 264/257, 314, 45.2, 271.1, 279.1, 342 R, 22, 25; 29/469

[56] References Cited

U.S. PATENT DOCUMENTS 3,387,414 6/1968 Adams .
4,514,447 4/1985 Boxmeyer .
4,704,240 11/1987 Reavely et al. .

FOREIGN PATENT DOCUMENTS 1176184 1/1970 United Kingdom .
WO88/10211 12/1988 World Int. Prop. O. .

OTHER PUBLICATIONS

Aguirre-Martinez, Proc. 4th Europ. Symp., Cannes 18-20 Sep. 1984.
Bodle, J. G. et al., Am. Inst. of Aeronautics and Astronautics, Inc. 1981.
Colton, et al., 34th Inter. SAMPE Sym., May 8-11, 1989.
Corbett and Dean, "Lightweight Rigid Solar Array Structural Considerations".
R. L. Cox et al., Raumfahrtforschung Heft May 1976.
R. N. Gounder, SAMPE Journal May/Jun. 1983.
K. Knapp, "Composite Materials and . . . Technology".
M. Robinson, 32nd Inter. SAMPE Symposium, Apr. 609, 1987.
M. Robinson, World of Composites, J. of Composites Technology and Research.
Sakatani and Yamamoto, Composites '86: Recent Advances in Japan and the U.S. (1986).
A. Smith, vol. I: System Development, USA Corps. of Engineers (1979).
A. Smith et al., vol. II Nonlinear Deformation . . . , Corps of Engineers (1979).
Sullivan and McIntosh, Modern Plastics, Aug. 1988.

*Primary Examiner*—Allan R. Kuhns
*Attorney, Agent, or Firm*—Hamilton, Brook, Smith & Reynolds

[57] ABSTRACT

A self-deploying structural element formed of a core or temperature sensitive expanding foam, a load carrying component of advanced composite material, and an outer retaining jacket. A heat generating means such as resistance heating wires is included to initiate deployment of the structure. The heating of the structure causes the foam core to expand, unrolling or unfolding the structure. The heat also cures the advanced composite material to a rigid form. The retaining jacket is preferably a heat shrink jacket which contracts around the composite material.

9 Claims, 5 Drawing Sheets

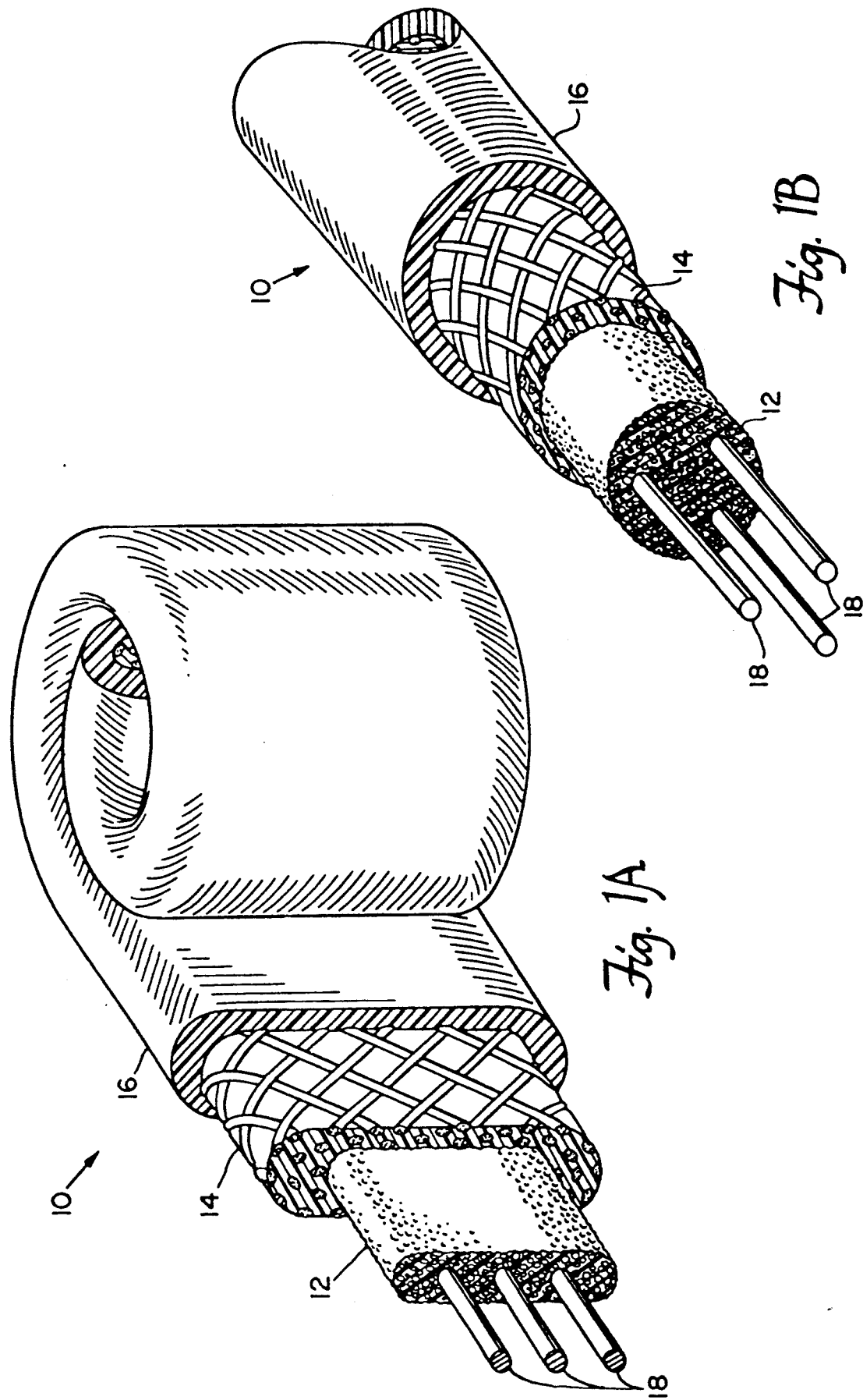

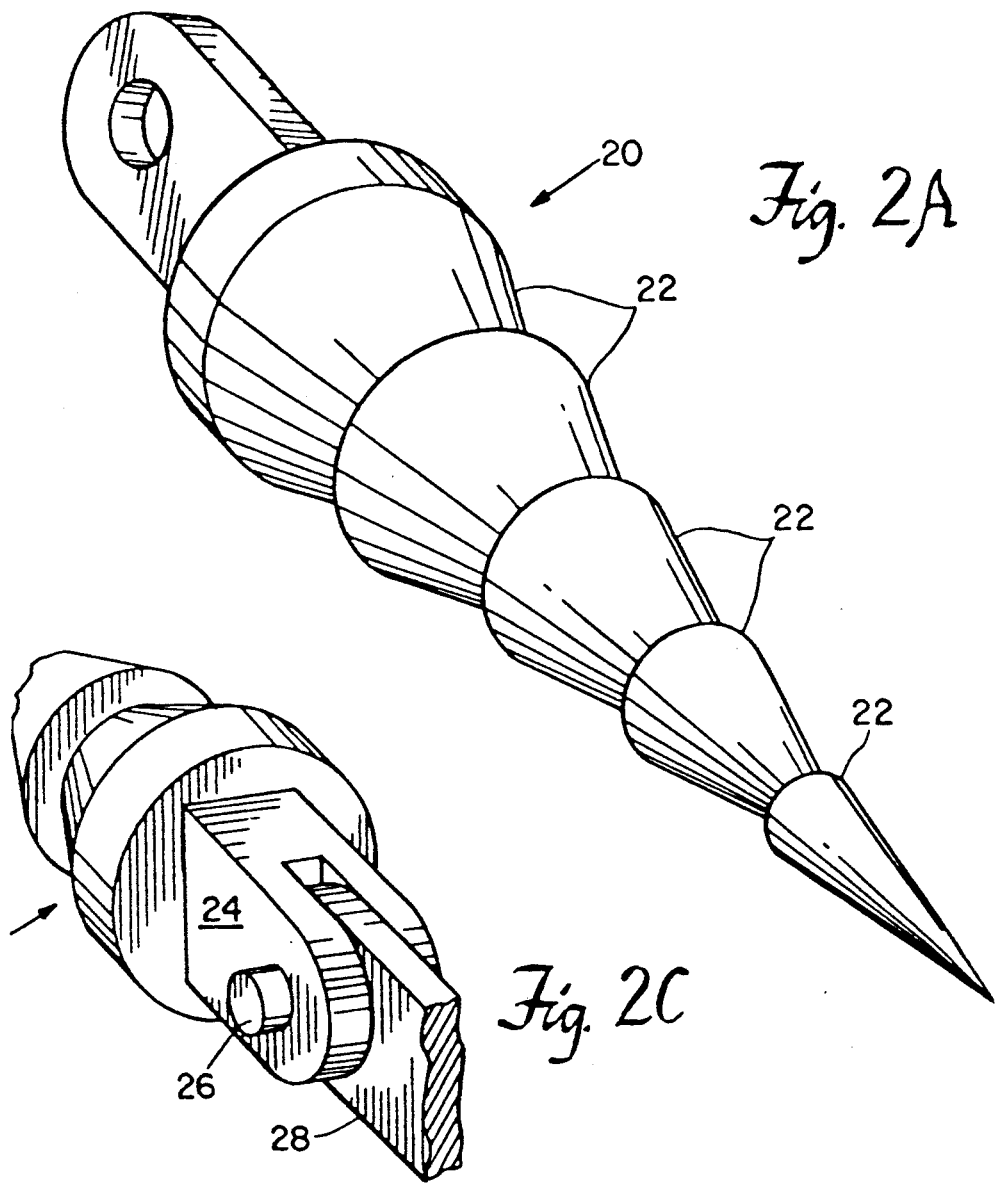
Fig. 2A
Fig. 2C
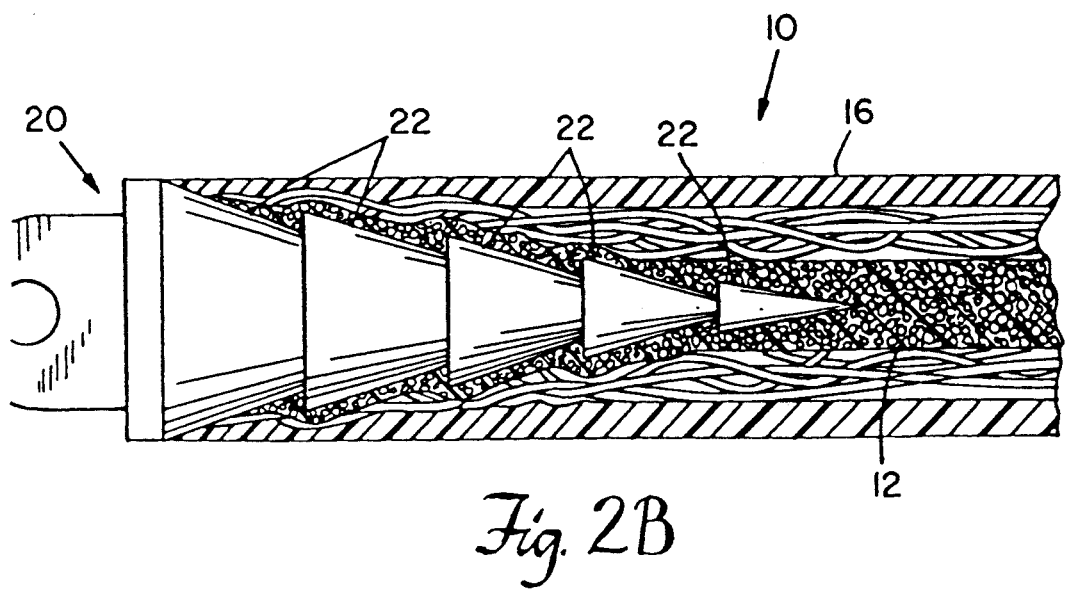
Fig. 2B

METHOD OF FABRICATING A SELF-DEPLOYING STRUCTURAL ELEMENT

This application is a division, of application Ser. No. 07/344,259, filed Apr. 27, 1989, now U.S. Pat. No. 4,978,564.

BACKGROUND

As technology progresses in the development of space, the need for orbital space structures continues to grow. Such structures will form the basic building blocks for military antenna structure and the NASA space station effort. With the high cost of transporting and assembling these structures, more and more emphasis is being placed on creating structures which can be transported in a minimum number of launches and assembled with a minimum amount of human effort.

Currently, there are two types of deployable space structures. The first type is structures whose components are fabricated and assembled on earth and subsequently deployed in space, while the second type is composite structures that are assembled in orbit with raw materials transported to the site by a launch vehicle, e.g., the space shuttle. The latter approach requires that processing equipment be lofted into orbit. The processing equipment for advanced composite materials (e.g, pultruders, filament winders, etc.) is typically weight intensive. The benefit of this approach, however, is that the raw materials may be efficiently stowed or packed in the launch vehicle without the concern of costly, elaborate and space consuming supports that terrestrially assembled structures require for transport.

Structures fabricated on earth employ two subsets of deployment systems. The first relies on mechanical strain energy stored in the system. These structures deploy by a release of boundary conditions or end constraints that allow the structure to deploy and seek a minimum potential energy configuration. The advantage of this approach is that joint and hinge type movement is minimized since most of the deployment motion occurs within the structure itself. The major drawback is that the energy storage capacity of the structure is limited, by the modulus and strength of the structural material. Furthermore, when in the stored configuration, since the internal loads are high, stress relaxation or creep may occur. This results in lost energy potential and the desired deployed configuration may not be achieved. It should also be noted that these systems are usually assisted by mechanical actuators such as power screws, friction rollers or planetary gears. Two such examples are the development of the Astromast by Astro Research Corporation, and the CTM biconvex mast developed by ESTEC, in the Netherlands.

The second subset of deployment schemes includes telescoping booms, folding plate designs, scissor mechanisms, articulated arms, and umbrella type devices. This is the most common type of design. The primary disadvantage of these designs is that they require a large number of hinges, latches, sockets, and joints. Since load demands on hinges and joints are substantial, they are areas of lowest reliability and failure during deployment.

There have been a number of recent designs that fall into this category. M. Aguirre-Martinez of ESTEC describes a thin walled carbon fiber telescoping design that requires a ball screw and motor drive to deploy. Flat panel hinged designs have been developed by D.A. Corbett and W. J. Dean of TRW Systems Group that utilize graphite/epoxy sytems. A composite tetratruss cell has been developed by M.J. Robinson at McDonnell Douglas using graphite/epoxy systems, which require the use of external actuators. Conventional scissor designs have been investigated for use in heat radiator applications by Roy L. Cox et al. of Vought Corporation. In addition, an umbrella deployment device using advanced composite ribs and wire mesh has been developed by M. Sullivan and B. McIntosh of Harris Corporation that requires a motor to open or drive the system into its deployed shape. All of these structures require external actuators that are weight and power consuming.

In common with the previously mentioned designs, new structural designs must face a multitude of requirements and constraints. The structures to be transported to the orbital site must reside in the shuttle bay, and must have a high packing density and be compact in the stowed configuration. Furthermore, while in this configuration, they must survive lift-off loads and accelerations. At the orbital site, the structure must be deployed reliably and without problems occurring due to mechanical actuator failure or human error or fatigue. Once reliably deployed at the site, the structure is required to perform its specific function. The deployed configurations are usually composed of a primary structure, such as a space truss that serves as a mechanical platform for a secondary structural component, such as an antenna, that might be a wire mesh or solar array panel. In this deployed state, there are many system considerations such as antenna surface or search control, vibrational control that requires specific damping characteristics and the consideration of long term effects of radiation or particle impact. Furthermore, extreme temperatures are experienced during orbit that induce thermal strains causing loads or defocussing deflections to occur. Therefore, these structures must have either near zero, or well characterized coefficients of thermal expansion. If residual internal loads exist in the structure after deployment, then material responses such as creep must also be considered.

The lifetime of these structures is expected to be in the order of 7 to 10 years before major modifications or maintenance must be performed. Compatible configurations and component commonality must also be considered for future structural additions. Finally, since deployment reliability and configuration accuracy is of paramount importance, structures that minimize the total number of components and rely on simple means for deployment are attractive.

SUMMARY OF THE INVENTION

The present invention provides a self-deploying structural element. The element comprises a central core of temperature sensitive expanding foam, with a load carrying component of advanced composite material surrounding the core. A retaining jacket surrounds the composite material. Heat generating means are provided which introduce heat to the body of the structural element. In the preferred embodiment, the shape of the structural element is cylindrical, with the central core, the load carrying component, and the retaining jacket being concentric with one another. In this embodiment, the retaining jacket is a heat shrink tube and the open ends of the structural elements are sealed with end terminations. The end terminations are provided with connecting means for linking to similar end terminations of other structural elements.

The structural element is flexible in its unheated state, allowing it to be rolled or folded for compact stowability. Heating of the element is accomplished by a resistance heating wire which is embedded in the core. Passing a current through the wire generates heat in the core proportional to the current. This heat causes the foam core to expand and the heat shrink retaining jacket to contract. The applied heat also causes the advance composite material to cure. The curing takes place while the composite material is under internal pressure from the expanding foam core and external pressure from the jacket.

An alternative method of generating heat involves replacing the foam core with exothermic reactants which generate heat when mixed. An external method is provided to mix the reactants within the element when necessary. Upon mixing, the reactants expand to create the pressure necessary to deploy the structure and generate heat sufficient to contract the jacket and cure the composite material. A thin membrane is used to keep the reactants separated within the structural element, such that when the membrane is ruptured, the reactants mix. In such a case, a resistance heating wire can be placed in contact with the membrane during fabrication. The ends of the wire extend beyond the ends of the structural element so that a current may be passed through the wire from an external source. The wire provides enough heat to rupture the membrane thus causing the reactants to mix.

BRIEF DESCRIPTION OF THE DRAWINGS

FIG. 1A is a partially exploded view of the self-deploying structural element in its undeployed state.

FIG. 1B is a partially exploded view of the structural element of FIG. 1A in its deployed state.

FIGS. 2A, 2B and 2C show end terminations used with the structural element.

DETAILED DESCRIPTION OF THE PREFERRED EMBODIMENTS

Figure 3:
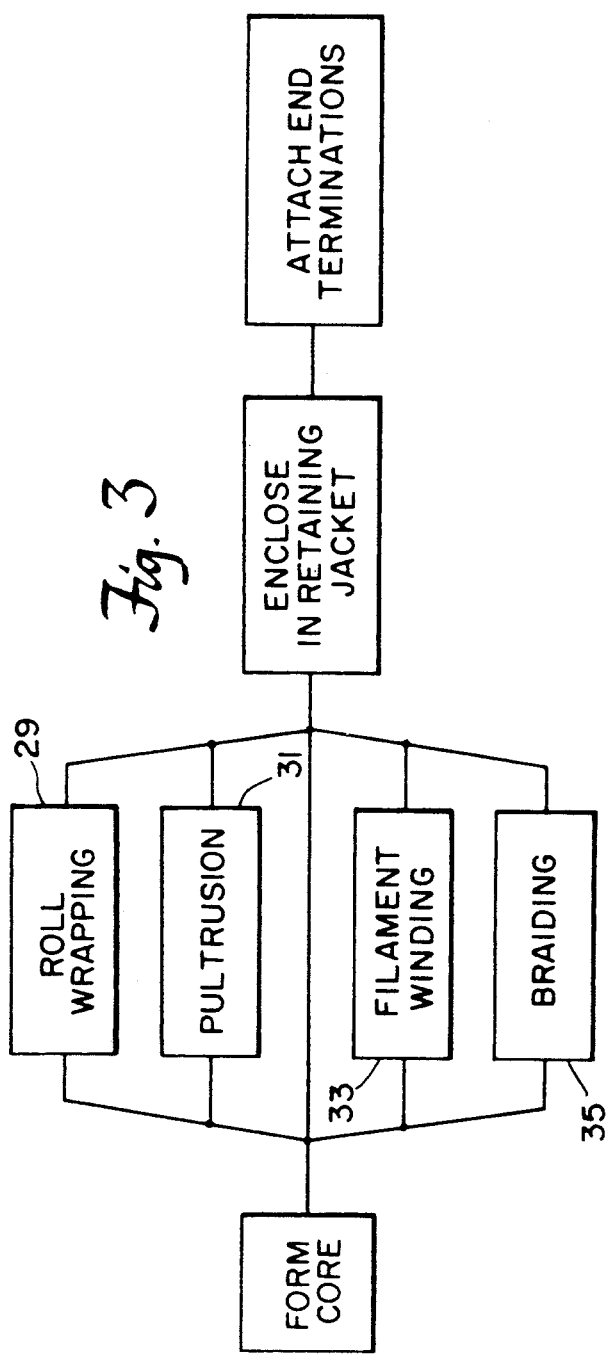
FIG. 3 is a block diagram showing methods for fabricating a structural element.

In FIG. 1A in partially exploded view form, a self-deploying structural element is generally indicated at 10. The structural element in the uncured state is in the form of a tube that is arranged to be rolled up into a flattened configuration. The flexible nature of the tube allows it to be compactly transported or stored while in an uncured state.

The structural element or tube 10 has five basic components. These components are a tube of advanced composite material 14, a foam core 12 within the tube, an outer jacket 16, a heating means 18, and end terminations 20 sealing the ends of the structural element 10.

The innermost component of the structure is a reacting foam 12 that expands at a threshold temperature. Such foams are commonly used in fire prevention, an example being 3M CP-25 Fire Stop which has a volume expansion of approximately 8:1. Surrounding the foam core 12 is a tube 14 of advanced composite material. The advanced composite material 14 is an organic matrix composite using high modulus reinforcing fibers. Some examples of the fibers used are graphite, duPont's Kevlar ®Aramid ®, glass, or oriented polyethylene. The organic matrix falls into either the thermosetting or the thermoplastic categories. Some of the preferable matrix materials of the thermosetting category are polyimide, epoxy, and polyester. Some of the preferable materials of the thermoplastic category are polyimide and PEEK (polyether-etherketone). Before curing, the composite structure 14 is in its B-stage state. In the B-stage, the material is not fully cured and is tacky and flexible allowing it to be rolled.

Surrounding the composite structure 14 is an external retaining jacket 16. The external jacket serves to provide a package within which the hybrid structure may be rolled up. In the present embodiment, the retaining jacket 16 is a heat shrink tubing which, upon application of heat beyond a threshold temperature, will shrink and provide external pressure on the composite structure 14. An example of such tubing is a polyethelene base oriented radiation cross linked material.

A method of heating structural element 10 is necessary to initiate deployment thereof. In the present embodiment, a resistance heating means is provided in the form of resistance heating wires 18. These heating wires 18 will generate heat within the structure when a current is passed through them. In place of the wires a resistance heating tape may be used in the same manner. Alternatively, graphite may be used in the composite, in which case the graphite material itself may be electrically energized and used as a resistance heater.

Deployment of the structural element 10 is initiated by connecting resistance heating wires 18 to a battery or other electrical source. This results in heat being generated in the center portion of the tube. Upon reaching a threshold temperature, the foam core 12 expands and creates internal pressure in the tube. If the structural element 10 is rolled or folded, the internal pressure provided by the expanding foam causes it to unroll or unfold. Because the retaining jacket 16 in the present embodiment is a heat shrink tubing, the heat introduced into the system also causes this tubing to contract and provide external pressure on the composite structure 14. As the structural element 10 unrolls and unfolds, it takes on a more cylindrical shape, as shown in FIG. 1B.

During deployment of the structural element, the heat generated completes the cure cycle of the composite tube and it becomes rigid in its deployed shape. In the present embodiment, the internal pressure provided by the expanding foam and the external pressure provided by the heat shrink tube contracting aids the curing process by consolidating the fibers of the composite material. Once cured, the composite tube becomes the primary load bearing component of the structural element.

FIG. 1B shows the structural element in its deployed state. The intumescent foam core is fully expanded, the heat shrink retaining jacket 16 is fully contracted, and the advanced composite material 14 is completely cured. In this state, the structural element is capable of being used as a load bearing member in a number of different structural designs.

In order to use the structural element in practical applications, it is necessary to seal the ends of each structural element and to additionally supply means by which to link different structural elements together. Both these requirements are satisfied in the present embodiment through the use of push-in end terminations 20, as shown in FIG. 2. FIG. 2A shows a preferred form of the end termination 20. The end termination 20 is a push-in type connector, the body of which consists of a series of conical projections 22 which enter the structural element and mechanically interlock with the material. The end termination 20 is pushed into the end of the structural element 10 prior to deployment. The internal action of the end termination 20 and the structural element 10 is shown in the cross section of FIG. 2B. Conical projections 22 are shown penetrating the element 10 and becoming locked within the core of the element. The pressure applied to the end termination 20 by the expanding foam 12 and the contracting jacket 16 will further lock the end termination 20 in place. Once cured, the end termination 20 becomes a permanent part of the structural element 10. One possible connection means for an end termination is shown in FIG. 2C. Clevis 24 is an extending portion of end termination 20 which may be linked to another clevis or a tongue by means of a pin 26. The clevis 24 of FIG. 2C is shown linking to tongue piece 28 which may be part of another end termination.

FIG. 3 is a block diagram outlining the fabrication procedure in forming the structural element of the present embodiment. This block diagram outlines a number of different ways that the tube of advanced composite material may be formed. The method of roll wrapping 29 involves wrapping preimpregnated tape around the foam core and allowing it to cure to the B-stage. Pultrusion 31 is the pulling of filament bundles saturated with resin through a heated die that cures the material in a prescribed shape. Filament winding 33 involves winding preimpregnated fiber around a rotating core. Braiding 35 is a a method similar to filament winding in which filamentary composite material is braided onto the internal core such that the fibers intertwine. Any of the above methods may be used for forming a tube of composite material satisfactory for the present invention.

During fabrication, shape memory alloys may be incorporated into the structure of the advanced composite tube. A shape memory alloy is a temperature sensitive material such as Nitonol which may be bent or coiled at room temperature. This bending changes the crystal structure of the material and it remains in the bent position. Upon the application of heat, however, the bent piece seeks its non-energetic state, and unbends or uncoils, returning to its original shape.

Depending upon which technique is used, the advanced composite tube may be formed around the core or may be formed individually and the core placed inside. During fabrication, any necessary resistance heaters are embedded within the structural element. In addition to these, any desired sensors may also be embedded to monitor parameters of the structural element during and after deployment. After the composite material is formed and the core is in place, the materials are enclosed in the retaining jacket. The final step is to attach the end terminations, but this is not necessary prior to deployment. One alternative is to fabricate one long piece of structural element material and wind it on a spool. Pieces may then be cut off in sections. The end terminations are plugged into the ends of a sub-section removed from the spool just prior to deploying the structural element. This allows an on-site determination of the necessary length of the structural element.

Figure 4:
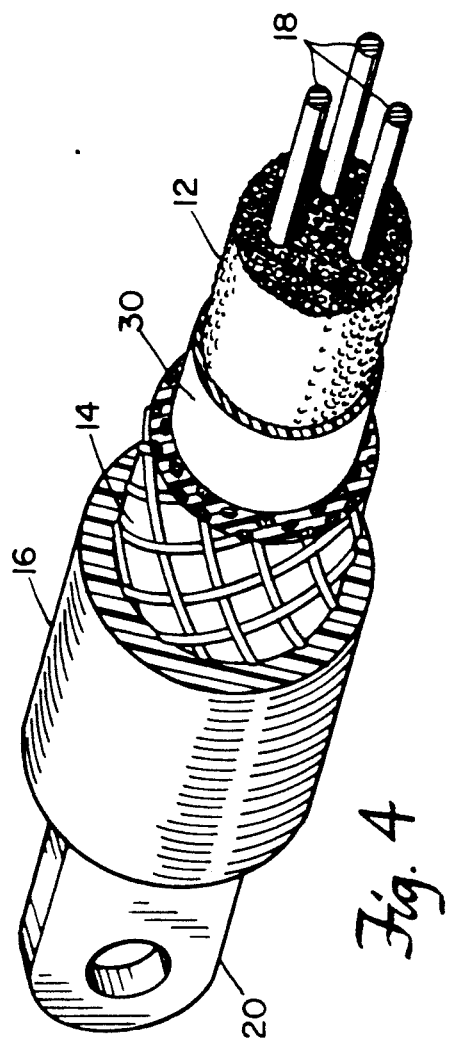
FIG. 4 is a partially exploded view of a structural element similar to FIG. 1B but with the addition of a liner between the core and the composite.

A variation on the embodiment of FIG. 1 is the addition of an impermeable liner 30 located between the foam core and the composite tube. FIG. 4 is similar to FIG. 1B but shows the location of this liner. The liner is particularly useful when the fibers of the composite tube 14 are somewhat dry. The liner prevents the foam of the foam core from penetrating the dry fibrous composite 14 when the foam core is expanding. The liner 30 thereby serves to prevent the composite tube 14 from being contaminated by the foam core, while also helping to more equally distribute the pressure of the expanding core.

Figure 5:
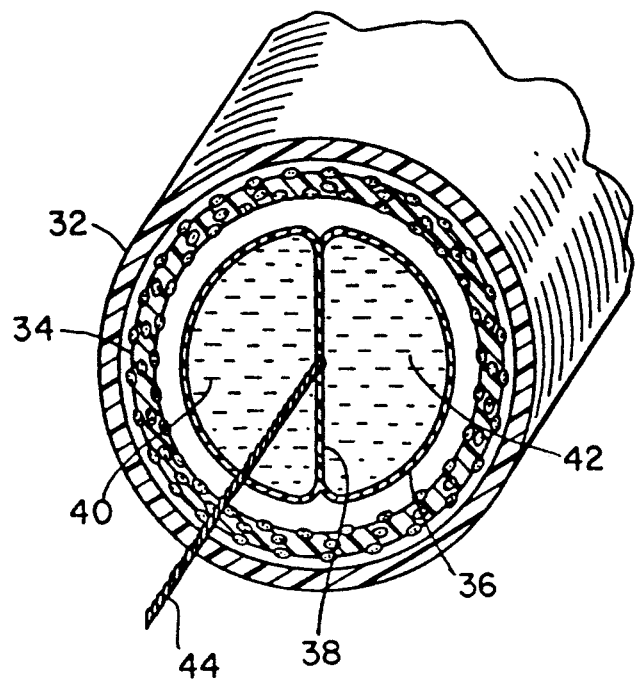
FIG. 5 is a cross section of a structural element having a core of exothermic reactants separated by a thin membrane.

Shown in FIG. 5 is an alternative embodiment to the structural element of FIG. 1. Although the retaining jacket and the composite tube are virtually the same, the foam core and the resistance heating means are replaced by an exothermic reactant pair. FIG. 5 is a cross section of such a structural element. Although the structural element of FIG. 5 is in its undeployed state, the retaining jacket 32 and the composite structure 34 are shown as being cylindrically concentric for illustrative purposes. Within the composite tube 34 is a flexible bag 36 which is divided into two compartments separated by thin membrane 38. Left compartment 40 houses a first exothermic reactant, while right hand compartment 42 houses a second reactant known to react with the first exothermic reactant. In the present embodiment, one reactant is from the diisocynate family while the other is from the glycol family. Mixing these two reactants produces an exothermic reaction which ultimately results in a polyurethane foam.

To initiate deployment of the element, a current is passed through heating wire 44 which in contact with membrane 38 and produces enough heat to rupture or melt the membrane. The rupturing of membrane 38 allows the two reactants to mix and the exothermic reaction to commence. The heat given off in the exothermic reaction is sufficient to cure composite tube 34 and cause retaining jacket 32 to shrink if it is a heat shrink tubing. In addition, the reaction also causes a volume expansion and a subsequent deploying of the structural element from its rolled or folded state. Thus, the exothermic reactant pair replaces both the expanding foam core and the resistance heating means of the embodiment of FIG. 1. As an alternative to the fine resistance heating wire 44, external pressure on the structural element can be used to rupture membrane 38 and initiate the reaction. In general, any external control which causes the two formerly separated reactants to mix is sufficient to initiate deployment of the element.

As an addition to the embodiments of either FIG. 1 or FIG. 5, sensors may be embedded within the structural elements during fabrication and after deployment be used to monitor system parameters. One possible form of sensor would be a piezoelectric device embedded in the composite structure and having signal wires leading out of the structural element. When the composite tube undergoes bending in the region of the piezoelectric device, a small piezoelectric signal is generated through the signal wires, which is detected through an external monitoring system. Another possible embedded sensor involves the braiding of an optical fiber into the fiber structure of the composite tube. An optical signal passed through the fiber would therefore change with any bending of the structural element, and hence could be used as an active system monitor.

Figure 6:
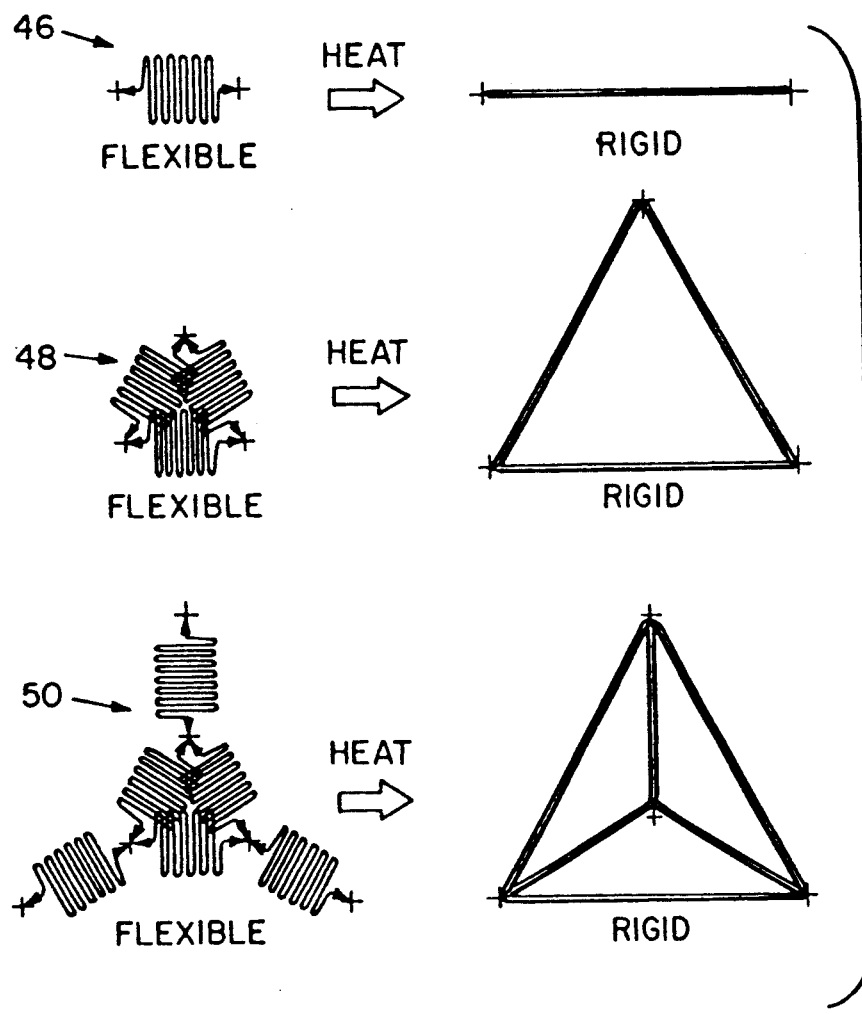
FIG. 6 is a schematic illustration of various building modules constructed from self-deploying structural elements in their undeployed and deployed states.

Using the linking end terminations, a number of structural elements may be linked together to form basic building module concepts. Such building modules are often used as the basic building blocks from which larger structures are assembled. These building modules may be linked together in their undeployed to state, the individual elements then being deployed to form a linked building module. FIG. 6 shows several building module concepts with the structural elements in their undeployed and deployed states. The first module shown is a single element alone. Besides being used to build a structure, this element could be an emergency sailboat mast which is stowed aboard a sailboat for use if the main mast breaks. The single element could also be used as a replacement utility pole which is erected quickly in the event that an existing pole is damaged. Another use for the single element is for cross country skiers who may sometimes break a ski pole beyond repair. The single deployable element is easily stowed and can be deployed quickly to replace a broken ski pole. The second module shown is a triangle, which comprises three linked structural elements and could be used as a deployable antenna structure for military or other communications applications. The third module shown is a tetrahedron, which comprises six linked structural elements. The tetrahedron is a structure which could be used as an easily deployed tent frame. Prior to deployment, the structure is lightweight and compact making it desirable for military applications. Building modules other than those shown in FIG. 6 are also possible.

Figure 7:
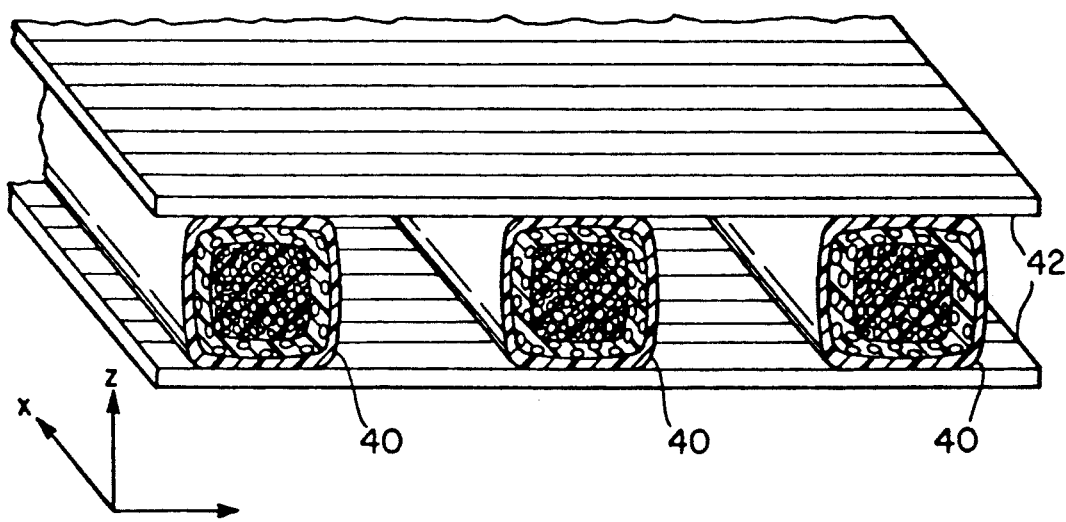
FIG. 7 is a partial perspective view of a self-deploying structural plate incorporating several self-deploying structural elements.

A further application of the self-deploying structural element is shown in FIG. 7. A number of structural elements 40 are lined parallel to one another and attached along their length to two parallel sheets 42. The sheets 42 are flexible in a direction parallel to the axes of the structural elements 40, while retaining a high bending stiffness in a direction perpendicular to the flexible direction. The sheets 42 are made from a totally woven fabric structure that is selectively impregnated with resin. Such a structure may be rolled along the flexible direction of the sheets 42 and stored in its rolled configuration. By then deploying the structural elements 40, the entire structure would deploy to become a rigid plate.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A method of fabricating a rigid tubular structural element from relatively flexible components comprising an inner core component, an uncured tube component and a retaining jacket component to form an elongate member capable of being stored in a rolled and flattened condition for ease in transportation, the method comprising:

forming said inner core component of a reactive foam which is expandable at a threshold temperature;
    enclosing the core component with said uncured tube component formed of composite material, the composite material comprising an organic matrix composite with high modulus fibers;
    enclosing the tube component of composite material with said retaining jacket component thereby forming said elongate member extending along a longitudinal axis;
    rolling up the elongate structure about an axis transverse the longitudinal axis to provide a rolled-up member; and
    heating the core component to expand the core component and to initiate a curing of the composite material resulting in expansion and unrolling of the rolled-up member to rigidize said member and form said structural element.

2. The method of claim 1 wherein the heating is provided by heat generating means which includes a resistance heating component disposed within one of the components.

3. The method of claim 1 wherein the inner core component is formed of exothermic reactants which are kept separate within the structural element and mixing the reactants within the structural element by external control once fabrication is complete.

4. The method of claim 1 further comprising fabricating the tube of composite material from materials including shape memory alloys which assist or supplement deployment of the structural element.

5. The method of claim 1 further comprising placing temperature sensors within the tube component during fabrication for measuring thermal distortion during deployment.

6. The method of claim 1 further comprising providing end terminations which seal the ends of the structural element.

7. The method of claim 1 further comprising providing a liner between the inner core and the composite material which is impermeable to penetration by the foam core.

8. The method of claim 1 wherein enclosing the tube of composite material with a retaining jacket comprises enclosing the tube of composite material with a heat shrink jacket which contracts at a threshold temperature.

9. A method of fabricating a rigid tubular structural element from relatively flexible components comprising an inner core component, an uncured tube component and a retaining jacket component to form an elongate member capable of being stored in a rolled and flattened condition for ease in transportation, the method comprising:

forming said inner core component comprising exothermic reactants separated by a membrane and capable of being mixed within the structural element; connecting a resistance heating wire, in contact with the membrane, to an external control whereby the membrane may be heated by current from the control, said current capable of passing through the wire resulting in rupture of the membrane allowing the exothermic reactants to mix and form an expanded foam core;
    enclosing the core component with said uncured tube component formed of composite material, the composite material comprising an organic matrix composite with high modulus fibers;
    enclosing the tube component of composite material with said retaining jacket component thereby forming said elongate member extending along a longitudinal axis;

rolling up the elongate structure about an axis transverse the longitudinal axis to provide a rolled-up member; and heating said inner core component by said current passing through the wire resulting in rupture of the membrane allowing exothermic reactants to expand the core component and to initiate a curing of the composite material resulting in expansion and unrolling of the rolled-up member to rigidize said member and form said structural element.

* * * * *